United States Patent [19] [11] 4,103,771
Klatt et al. [45] Aug. 1, 1978

[54] DETECTING RESIN CURE

[75] Inventors: Kenneth G. Klatt, Brown Deer; Leon D. Robnolt, Jr., New Berlin, both of Wis.

[73] Assignee: Rexnord Inc., Milwaukee, Wis.

[21] Appl. No.: 695,099

[22] Filed: Jun. 11, 1976

[51] Int. Cl.² .................. B65D 77/08; B65D 31/12
[52] U.S. Cl. ................................ 206/219; 61/45 B
[58] Field of Search ............... 61/45 B; 206/219; 229/56; 260/37 N; 23/230 M

[56] References Cited

U.S. PATENT DOCUMENTS

| 3,773,706 | 11/1973 | Dunn | 260/37 N |
| 3,861,522 | 1/1975 | Llewellyn | 229/56 |
| 3,915,297 | 10/1975 | Rausch | 206/219 |

Primary Examiner—Robert I. Smith
Attorney, Agent, or Firm—Kinzer, Plyer, Dorn & McEachran

[57] ABSTRACT

Commencement of resin cure may be visually observed by including a dye with the resin reactants; the dye imparts one color to the unreacted components and changes the color as an incident to the chemistry of gelation.

3 Claims, 5 Drawing Figures

DETECTING RESIN CURE

This invention concerns a method of (and means for) detecting, by color change, the onset of gelation during resin cure.

The invention is particularly useful in detecting the onset of cure in resins employed to anchor rock bolts. Utility will therefore be described in the limited sense of anchoring a rock bolt but the invention may be applied to other industrial purposes where it would be advantageous to visibly detect the onset of resin gelation as an indication of the commencement of resin cure.

Rock bolts are employed by Civil Engineers to stabilize such structures as mine ceilings and overhanging rock strata where fissures or faults impart instability. Typically a hole is drilled across the plane of separation, a reactable resin mixture (reactants in a package) is positioned in the hole, a bolt is inserted and a rotary tool is then coupled to the free end of the bolt, turning the bolt, breaking the package and mixing the resin reactants. This mixing starts resin cure and when the resin is fully cured the bolt is anchored fast. The bolt, being fast, is employed in constructing reinforcement.

The engineers want a resin which will cure to a hardened infusible state in about 5 minutes or less so that they may quickly move on the next drill hole site. Usually the test for resin cure, to be sure the components reacted, is to tug or yank on the bolt, or apply a torsional force with a suitable tool.

In the typical resin cure, the first stage of reaction is gelation provided of course that the resin reaction mixture is viable. If an agent or constituent is not potent, or if there is incomplete mixing, the effort is a failure, but if gelation is attained the resin will cure within several minutes. It is therefore an object of the present invention to enable the onset of cure (gelation) to be visually observed so that rock bolt installation may be accelerated by minimizing testing.

The invention is therefore manifest in increased productivity, which may obviously be extended to other industrial applications.

Specifically it is an object of the present invention to incorporate in one of the resin materials a dye (or pigment) which will change color as an incident to gelation, leaving no doubt the resin is on its way to a complete and final cure. Another object of the invention is to use an excess of resin, more than the volume required to fill the concentric space surrounding the inserted mechanical part, so that excess resin will be squeezed out as a collar of generous proportion at the free end of the hole where the color change may be seen.

Resin systems for anchoring rock bolts are known U.S. Pat. No. 3,731,791 for example. Thus, one resin system susceptible to the practice of the present invention is an unsaturated polyester resin system characterized by a polyester prepolymer (essentially linear) containing ethylenic unsaturation (—C=C—) capable of being cross linked (cured) through the double bonds (—C=C—) with a vinyl monomer which contains ethylenic unsaturation. Typically the polyester reaction constituent will be the prepolymer obtained by condensing a dicarboxylic acid (maleic, fumaric and so on) with a dihydroxy alcohol; the reactive monomer may be a vinyl such as styrene, diallyl phthalate, vinyl toluene and so on. The reaction, resulting in thermoset, is catalyzed by benzoyl peroxide, methylethyl ketone peroxide and so on.

Another thermosetting resin system useful under the present invention is an epoxy prepolymer and a hardening agent. This system is also described in U.S. Pat. No. 3,731,791 as useful for anchoring rock bolts. This prepolymer (essentially linear) is also well known and is usually prepared by condensation of a polyhdroxy compound (e.g. bisphenol) with an excess of epichlorohydrin in most cases so that the terminal groups of the prepolymer are terminal epoxides,

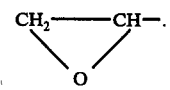

Here, final cross linking to give an infusible, insoluble, hard thermoset resin is by way of opening and cross linking through the terminal epoxide sites, usually by an amine. A similar system can be formed by cross-linking the epoxy sites, using a Lewis acid catalyst such as $BF_3$ adducts for this purpose.

EXAMPLE 1 (55-17)

| Material | Parts by Weight |
| --- | --- |
| A. Unsaturated polyester resin solution (with inhibitor and Promoter) | |
| 1. ethylene glycol maleic anhydride polyester prepolymer (70% of A) | 506.8 |
| 2. styrene and vinyl toluene (liquid diluent reactive monomer; 30% of A) | 217.2 |
| B. Calcium carbonate (filler) | 1759.0 |
| C. Titania (TiO$_2$; for color toning) | 8.9 |
| D. Asbestos (to suspend the filler) | 8.0 |
| E. Benzoyl peroxide ("BPO", catalyst) | 150.0 |
| F. Oil Blue dye | 0.46 |

The resin reactants will have been pre-mixed, as is customary, with an inhibitor (e.g. hydroquinone) which prevents room temperature reaction and a promoter (e.g. dimethylaniline) to accelerate the action of the catalyst at room temperature. Constituents A, B, C, D and F are mixed as one batch (I) and when so mixed show a sky blue color.

The catalyst (II) (solid granules) is withheld from mixture I. The catalyst may be mixed with an innocuous liquid vehicle such as dibutyl phthalate.

Figure 1:
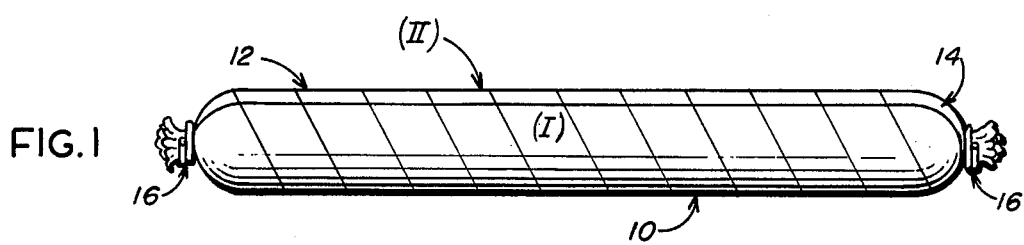
FIG. 1 is a view of a rupturable cartridge containing resin reactants.

Contents I and II are then packaged separately in respective pockets 10 and 12 of a flexible plastic (Mylar-polyethylene laminate) cartridge 14, FIG. 1, having snipped ends closed by wire twists 16. The exact form of the cartridge is not important as long as separation is maintained.

Figure 2:
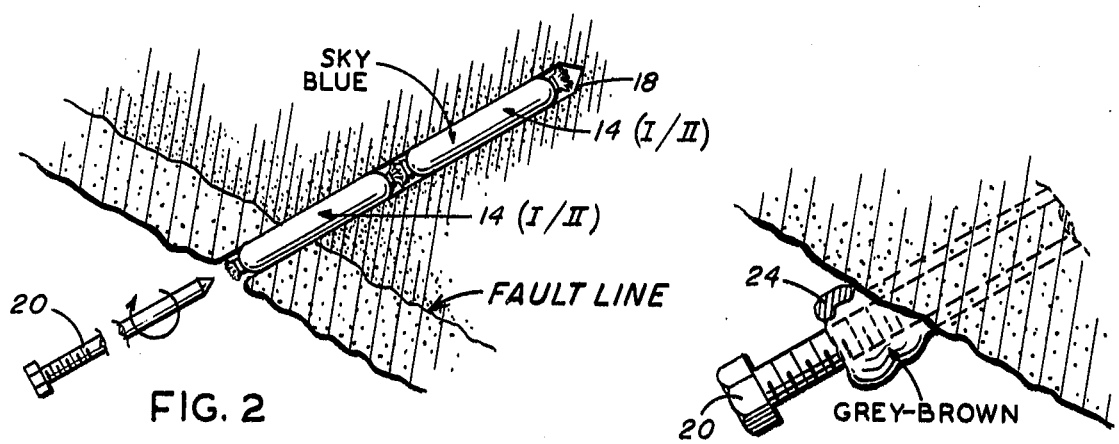
FIG. 2 is a schematic view showing cartridge implantation and rock bolt insertion.

The cartridge 14 is of a size that two, end-to-end, will fit a four foot long hole 18 for a rock bolt 20, FIG. 2, intended as part of the reinforcement for a rock structure fault line. Thus, the hole is drilled, the cartridges are implanted and the rock bolt is pressed home. The rock bolt has an adapter at the free end which is coupled to a tool which rotates the bolt, rupturing the plastic pouches and resulting in the catalyst (II) being spread uniformly throughout mixture I.

The ingredients, being mixed, start to gel if all the reactants are indeed viable and the Oil Blue dye changes the mixture from sky blue (unreacted) to greyish-brown, most likely as a result of the dye being exposed to the oxidation-reduction reactions, and the free radical reaction mechanism upon unsaturation of the dye itself, which occur in the course of cross linking.

Figure 3:
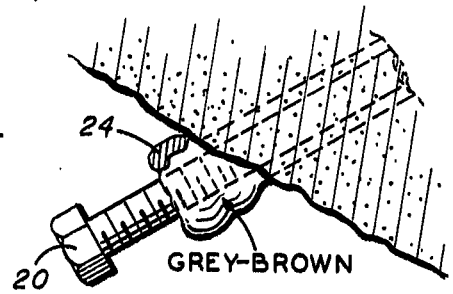
FIG. 3 is a fragementary view showing the advantages of excess resin.
Figure 4:
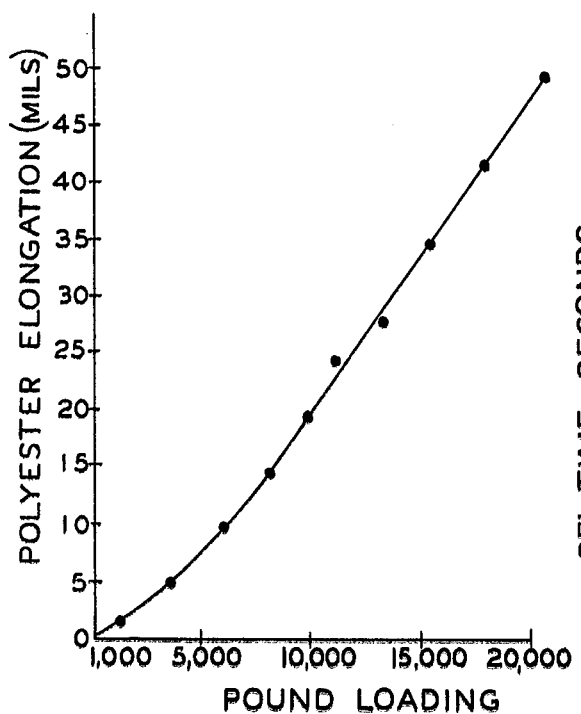
FIGS. 4 and 5 are performance curves of a polyester resin.

For two cartridges 14, each of 17 $\frac{1}{2}$ inches length and $\frac{7}{8}$ inches diameter located in a four foot hole receiving a $\frac{5}{8}$ inch re-bar bolt, the bolt is spun for 20 seconds; gelling and color change occur during the next 20 seconds. The amount of resin mixture contained in the cartridges is predetermined as an excess for whatever standard bolt diameter and drill hole length are used so there will be a collar of resin 24, FIG. 3, representing the excess at the free end of the bolt where the color change may be monitored. In some instances only one cartridge will be needed, meaning a shorter bolt of course. If the color change occurs, the next hole can be started. Cure is complete (total resin set) in about 5 minutes. FIG. 4 shows elongation tests performed on the cured resin.

Figure 5:
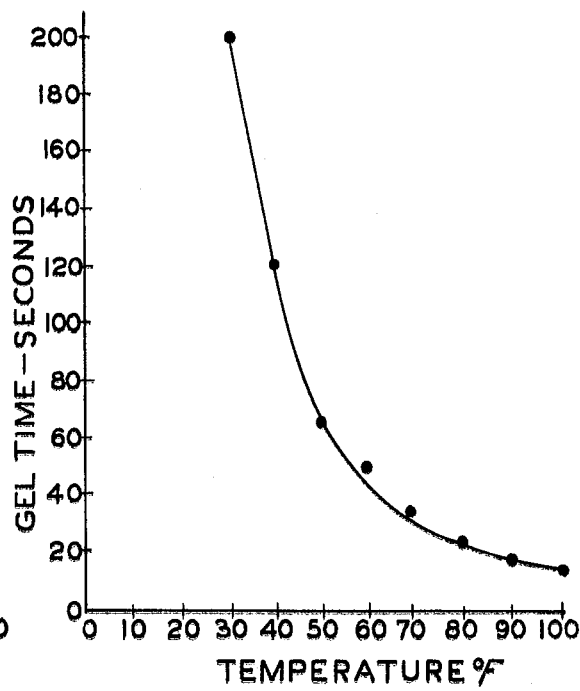

Gel time can be varied by varying relative proportions of catalyst and inhibitor-promoter. Gel time is also a function of temperature; see FIG. 5 which is based on Example 1.

Obviously the cartridges may vary in size in accordance with different rock bolt standards.

The same color change occurs if sand or alumina is used as the filler instead of calcium carbonate. Shading and therefore color contrast can be varied by more or less titania, or other "whitener".

EXAMPLE 2 (55-18)

| Material | Parts by Weight |
| --- | --- |
| A. Same as Example 1 | 571.0 |
| B. Same as Example 1 | 1400.0 |
| C. Same as Example 1 | 7.12 |
| D. Same as Example 1 | 20.0 |
| E. Same as Example 1 | 34.26 |
| F. Oil Blue dye plus Peacock Yellow pigment | 0.56 |

The mixture of A, B, C, D and F (with an inhibitor and promoter) is green; when mixed with the catalyst, gelling takes place in about 60 seconds and the onset of gelation is accompanied by a change in color from green to tan.

EXAMPLE 3

| Material | Parts by Weight |
| --- | --- |
| Epon 828 (bisphenol-A type epoxy) | 100 |
| Silica flour (325 mesh) | 100 |
| Oil Blue dye | 1 |
| TiO$_2$ | 4 |
| Asbestos | 5 |
| Curing Agent(BF$_3$ type; LEECURE B-610 or B-614) | 10 |

The curing agent (liquid) is separated from the remainder in the manner of Example 1 and as shown at II in FIG. 1. Again the uncured contents are sky blue in color and when gelling is well on its way, after breaking the cartridge and mixing the curing agent, the color stabilizes at a lilac-pink, evidencing the onset of cure.

Practice is not limited to any particular resin system which, when reacted, cures to a thermoset state. There are numerous polyester and epoxy prepolymers which can be cured to the thermoset state by cross linking with a compatible monomer. The choice is usually based on conditions such as cost, curing time and strength.

In the case of the polyester the linear prepolymer may be viewed as a chain of (acid-glycol-acid-glycol).

The acid contains the unsaturation sites, enabling two such chains to be cross linked by the monomer such as styrene or vinyl toluene. The monomer is liquid. The catalyst supplies a free radical which opens but does not join to the double bonds at the unsaturation sites.

In the preferred example, Example 1, the final resin (mole basis) is about one-third acid, one-third glycol, one-third styrene-vinyl toluene.

In the epoxy prepolymer, Example 3, two of the linear prepolymer epoxy chains are cross linked at the epoxy sites. There are equivalents, but slower. Thus, the curing agent in the epoxy system may be di- or polyfunctional amine, acid or anhydride. Curing conditions and properties are determined by the choice of the curing agent. If the prepolymer contains hydroxyl sites (—OH) there may also be cross linking at those sites if an acid or anhydride is used. In the instance of an amine, for example, the cross link between two epoxy sites is

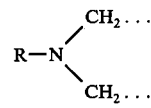

and again it is believed the color change is due to the dye being exposed to the oxidation reduction potentials occuring during cross linking.

The superior dye is Oil Blue but diligent search may reveal others, even those giving a different color change, and this is perhaps also true of a pigment.

Practice of the invention, as already noted, is not limited to rock bolts since there are other mechanical parts which can be anchored in a similar fashion, even connectors, adapters, fittings and electronic components. Also, the components of the reacting resin system need not necessarily be blended by rupturing a cartridge. For example, these resin systems may be used in a pumpable process where metered mixing equipment is employed both to inject and mix the reactants. By using the dye, it can be determined if the supply of a necessary component is depleted, in which event the color change will not take place. Oil Blue is 1,4-di (isopropyl amino) anthraquonone also written as $C_{26}H_{34}O_2N_2$.

We claim:

1. In a method of anchoring in a hole a rock bolt by means of rotating the bolt in a resin reaction mixture in the hole including a cross linkable polyester prepolymer reaction constituent which undergoes cross linking by a curing agent through the prepolymer chains and is thereby cured to a hard, infusible thermoset resin, and wherein gelation characterizes the onset of resin cure, the step of inserting and then rotating a rock bolt in the opening in which the reaction mixture has been implanted together with an Oil Blue dye which is distributed throughout the resin but separated from the curing agent in a plastic package ruptured when the bolt is rotated to release the dye which undergoes a color change characterizing the onset of resin cure if resin cure indeed occurs.

2. The method of claim 1 wherein the reacting mixture is in sufficient volume excess that upon inserting the bolt a portion of the reaction mixture is extruded from the hole to enable the color change to be observed.

3. A multi-pocket flexible rupturable cartridge sized to fit a rock bolt hole and containing resin reactants including, in one pocket, a polyester prepolymer reaction constituent capable of being cross linked and thereby cured to a hard, infusible thermoset state, the commencement of cure being characterized by a gel stage, along with Oil Blue dye which undergoes a color change as an incident to gelation, and an agent which starts the reaction located in another pocket.

* * * * *